United States Patent
Grenda et al.

(10) Patent No.: US 6,948,840 B2
(45) Date of Patent: Sep. 27, 2005

(54) LIGHT EMITTING DIODE LIGHT BAR

(75) Inventors: Christopher Grenda, Grafton, WI (US); Ferenc Mohacsi, Muskego, WI (US)

(73) Assignee: Everbrite, LLC, Greenfield, WI (US)

( * ) Notice: Subject to any disclaimer, the term of this patent is extended or adjusted under 35 U.S.C. 154(b) by 4 days.

(21) Appl. No.: 10/280,832

(22) Filed: Oct. 25, 2002

(65) Prior Publication Data

US 2003/0095399 A1 May 22, 2003

Related U.S. Application Data

(60) Provisional application No. 60/332,702, filed on Nov. 16, 2001.

(51) Int. Cl.⁷ .............................. F21V 7/09; G02B 6/24
(52) U.S. Cl. ......................... 362/555; 362/31; 362/558
(58) Field of Search ................................ 362/310, 551, 362/555, 560; 40/546

(56) References Cited

U.S. PATENT DOCUMENTS

| | | | |
|---|---|---|---|
| 4,835,661 A | | 5/1989 | Fogleberg et al. |
| 4,959,759 A | | 9/1990 | Kohler |
| 5,239,450 A | | 8/1993 | Wall |
| 5,271,077 A | * | 12/1993 | Brockman et al. ............ 385/31 |
| 5,502,623 A | * | 3/1996 | Brotz ......................... 362/99 |
| 5,539,623 A | * | 7/1996 | Gurz et al. ................... 362/20 |
| 5,590,945 A | * | 1/1997 | Simms ....................... 362/31 |
| 5,678,913 A | | 10/1997 | Ishimaru et al. |
| 6,102,559 A | | 8/2000 | Nold et al. |
| 6,139,163 A | * | 10/2000 | Satoh et al. .................. 362/31 |
| 6,151,166 A | | 11/2000 | Matsushita et al. |
| 6,155,692 A | | 12/2000 | Ohkawa |
| 6,185,356 B1 | | 2/2001 | Parker et al. |
| 6,196,691 B1 | | 3/2001 | Ochiai |
| 6,238,076 B1 | | 5/2001 | Pascale et al. |
| 6,257,737 B1 | * | 7/2001 | Marshall et al. ............ 362/231 |
| 6,272,269 B1 | | 8/2001 | Naum |
| 6,283,602 B1 | | 9/2001 | Kawaguchi et al. |
| 6,464,367 B2 | * | 10/2002 | Ito et al. ....................... 362/31 |
| 6,637,924 B2 | * | 10/2003 | Pelka et al. ................. 362/555 |
| 6,663,262 B2 | * | 12/2003 | Boyd et al. ................. 362/296 |

OTHER PUBLICATIONS

ELF Atochem North America, Inc., Plexiglas Elit brochure, Jul. 1999, USA.

* cited by examiner

*Primary Examiner*—Ali Alavi
(74) *Attorney, Agent, or Firm*—Michael Best & Friedrich LLP

(57) ABSTRACT

A lighting fixture is disclosed which provides a substantially uniform elongated light output, yet is powered by only a minimum number of inexpensive light emitting diodes. The lighting fixture has a curved back surface and a selected focal area to provide a substantially uniform output. Multiple LEDs may be controlled by a controller to provide special lighting effects. Each of the side surfaces and the back surface may include a reflector. The lighting fixtures preferably have flat end surfaces so they may be placed end-to-end to create an elongated light bar of any desired length.

27 Claims, 5 Drawing Sheets

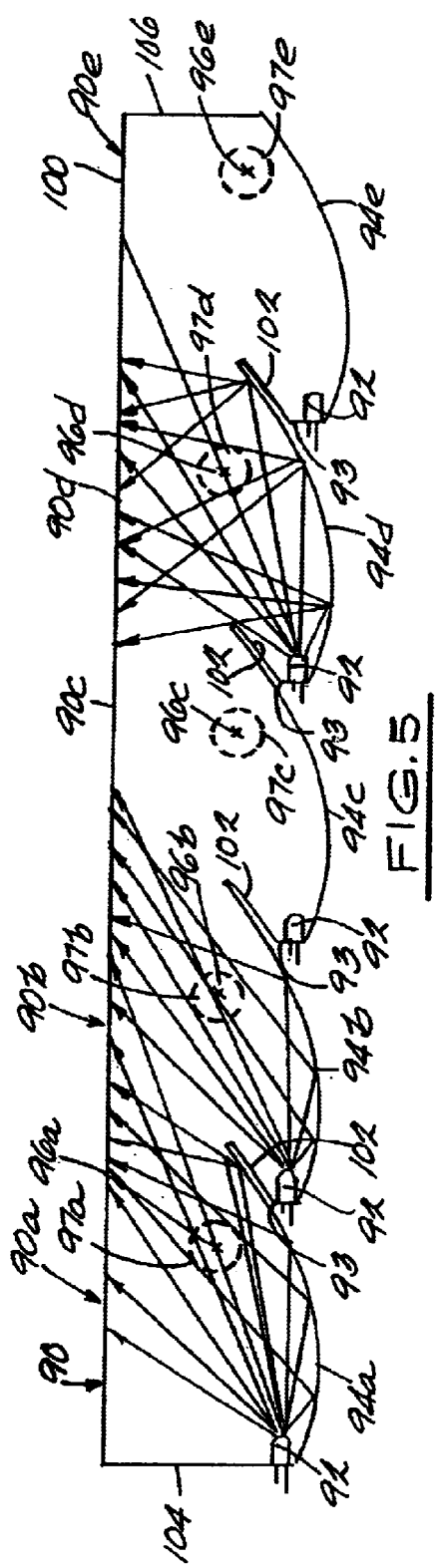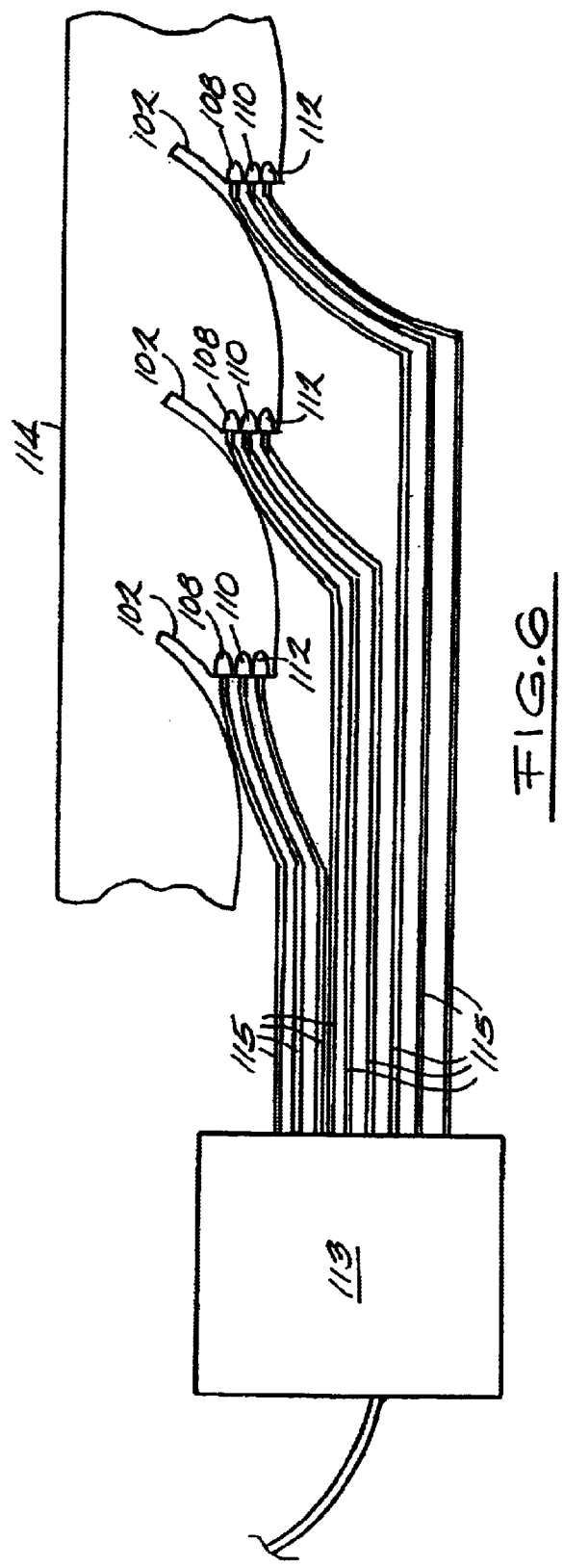

LIGHT EMITTING DIODE LIGHT BAR

This patent application claims priority from the U.S. Provisional Patent Application No. 60/332,702 filed Nov. 16, 2001, which is incorporated herein by reference.

BACKGROUND OF THE INVENTION

This invention relates to lighting fixtures. More particularly, this invention relates to lighting fixtures using light emitting diodes.

It is known to use fluorescent and neon tubes to provide accent or strip lighting wherein a substantially uniform elongated light output or bar of light is desired. However, fluorescent and neon tubes are relatively expensive to manufacture, and require special power supplies for their operation.

It is also known to use fluorescent and neon tubes, or liquid crystal displays as segments in a seven or fourteen segment alphanumerical character for scoreboards, signs and the like. Again, such displays are relatively expensive and complex.

SUMMARY OF THE INVENTION

A primary feature and advantage of the present invention is to provide a light fixture having reduced cost that provides a highly uniform, elongated light output or bar of light. The present invention uses a minimum number of light emitting diodes to achieve such an elongated output or light bar. The use of low cost light emitting diodes, translucent light guides, and novel reflective surfaces enables a uniform, elongated light output to be achieved at a relatively low cost.

The present invention comprises a lighting fixture having a translucent member or light guide that has an output surface, a curved back surface having a first reflector thereon, first and second side surfaces, an end surface, and at least one light emitting diode ("LED") interconnected with the first end surface. In one embodiment, the first and second side surfaces are substantially planar and parallel to each other, although in another embodiment they are non-parallel and generally diverging so that the output surface is substantially wider than the back surface.

In one embodiment, the lighting fixture is modular in nature, so that lighting fixtures may be placed end to end to create an elongated light bar of any desired length. The modular unit preferably includes a first end surface having a first section and a recessed second section, with at least one light emitting diode being interconnected with the second section. The first section may be placed adjacent to a second end surface from another module so that the modules are placed end to end and thus form an elongated light bar.

A modular unit may also include several sections, each with one or more light emitting diodes and a curved back surface. Each light emitting section has a focal area toward which all light rays reflected off of the respective curve surface are directed before they proceed out of the output surface. Each light emitting section or module preferably has a blocking surface adjacent to a light emitting diode to prevent light emitted from the side of the LED from directly reaching the output surface without being reflected. This arrangement avoids non-uniform output or "hot spots", which are areas of excessive brightness visible to the observer.

In another configuration, the invention includes two or even three adjacent LEDs on the first end surface, which are controlled by a preprogrammed controller. This enables the LEDs to be sequenced, flashed, faded or mixed to achieve a wide variety of colors and lighting effects.

In other embodiments, the light guide is formed with an air gap therein. In yet another embodiment, light diffusing particles are dispersed throughout the light guide.

It is a feature and advantage of the present invention to evenly distribute a point source of light on a predetermined output surface using a minimum number of LEDs.

Other features and advantages will be apparent to those skilled in the art from the detailed description of the invention and the drawings.

BRIEF DESCRIPTION OF THE DRAWINGS

FIG. 5 depicts another embodiment of the invention having multiple LED sections.

FIG. 6 depicts an embodiment having three LEDs in each section.

DETAILED DESCRIPTION

Figure 1:
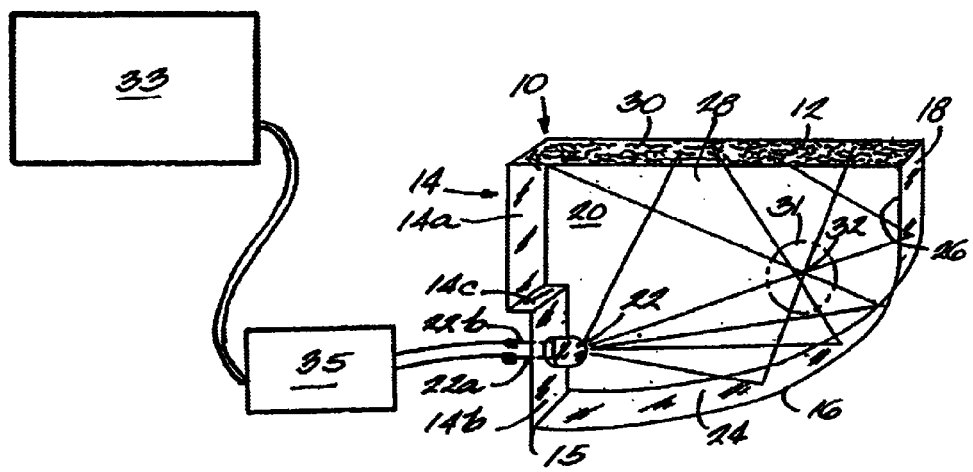
FIG. 1 is a perspective view of a single lighting fixture module according to a first embodiment of the present invention.

FIG. 1 depicts a first embodiment of a lighting fixture 10 according to the present invention. Fixture 10 is preferably, though not necessarily, a modular unit that may be placed adjacent to other similar lighting fixtures.

In FIG. 1, fixture 10 includes an output surface 12, a first end surface 14, a curved back surface 16, and a second end surface 18 that is opposite to first end surface 14. Output surface 12 is either clear or has a diffusive reflector or diffuser formed integral therewith.

Fixture 10 is primarily comprised of a translucent wave guide 20 made from acrylic, glass, a gel, a liquid, air, or other translucent material. It has a high total internal reflection such that there is a large difference of the index of refraction between light guide's boundaries and the surrounding medium (which is typically air). Wave guide 20 is preferably transparent at the wavelength of the output of the light emitting diode 22. Therefore, if LED 22 is a red LED, the light guide could be transparent or it could be made from a translucent red material.

Back surface 16 and second end surface 18 have respective reflectors 24 and 26 thereon. It is preferred that reflective surfaces 24 and 26 comprise specular reflectors, which act like mirrors to reflect incident light. The use of specular reflectors is preferred since scattering is reduced and thus more of the incident light will be reflected out of output surface 12 instead of out of parallel side surfaces 28 and 30.

To prevent such light loss out of surfaces 28 and 30, surfaces 28 and 30 could also be formed with respective reflectors thereon.

First end surface 14 is preferably comprised of a first section 14a and a recessed second section 14b, with an intermediate section 14c therebetween. LED 22 is interconnected with recessed section 14b, preferably using an epoxy whose index of refraction is matched to the index of the light guide material to minimize refractive losses. An epoxy with a refractive index of 1.5 is preferred for use with an acrylic light guide. The purpose of recessing section 14b is to provide space for LED lead wires 22a and 22b so that lighting fixture 10 may be placed adjacent to a similar lighting fixture.

Opposite to first end surface 14 is a second end surface 18 having a corresponding shape. Again, this enables second end surface 18 to be placed adjacent to a first end surface of an adjacent lighting fixture, to create an elongated light bar having a relatively uniform light output.

The embodiment depicted in FIG. 1 has a length (defined as the distance between end surfaces 14 and 18) of any length up to about 16 inches, with 8 inches being preferred. As the length becomes significantly longer than 8 inches, the light output becomes dimmer.

Also, lighting fixture 10 is designed such that approximately one-half of the total height of the lighting fixture is comprised of second end surface 18, with the remainder of the height being due to the curvature of curved surface 16. The height of fixture 10 is defined as the shortest distance between output surface 12 and the intersection 15 of first end surface 14 with curved surface 16. The LED is positioned and the curved surface 16 is designed so that light incident on the curved surface 16 has a long focal length.

Curved surface 16 could be parabolic in shape, or as shown in FIG. 1, it may be curved in the length direction (i.e., the direction between end surfaces 14 and 18), but substantially flat in the width direction, that is the direction between side surfaces 28 and 30. The curvature of end surface 16 is selected so that light output from LED 22 incident on reflective surface 24 is directed in an area 31 around a focal point 32 (hereinafter such area being called the "focal area"). Lighting fixture 10 and particularly back surface 16 are also selected such that approximately 70 percent of all the light output from LED 22 passes through the focal area 31, and 30 percent of the output light from the LED does not pass through the focal area 31. This configuration tends to minimize unusually bright or "hot" spots visible by an observer of the output surface 12. The focal area is preferably located at about one-half of the height of lighting fixture 10.

A power supply 33 converts line power to the low voltage DC power needed to operate controller 35. LEDs typically require 1.5 to 4.5 VDC, 20 to 25 mA current, although some LEDs require up to 350 mA current. Controller 35 in turn provides power to LED 22. Controller 35 may also be programmed to flash, fade or pulse the LED. One suitable controller is a model no. 600/8010 made by Everbrite, Inc. of Greenfield, Wis.

Figure 2:
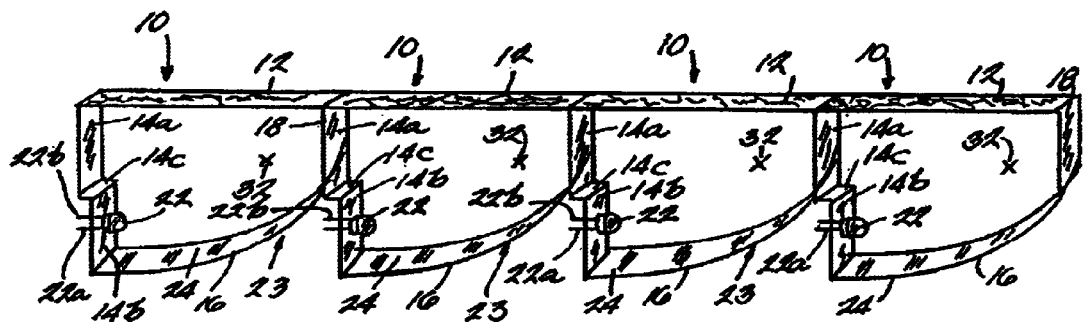
FIG. 2 is a perspective view of a series of modular lighting fixtures placed end to end.

FIG. 2 depicts a plurality of lighting fixtures 10 disposed adjacent to each other to create an elongated light output or light bar. As readily apparent from FIG. 2, the corresponding shapes and configurations of first section 14a and second end surface 18 enable the modules 10 to be placed directly adjacent to each other to create a continuous bar of light. Also, the placement of LED 22 on recessed sections 14b, together with the space 23 created by the curvature of back surface 16, create sufficient clearance for the leads 22a and 22b of the respective LEDs 22. This configuration depicted in FIG. 2 is particularly suitable for decorative or accent lighting such as that used to mark the outlines of steps or floors, or as edge lighting for a backlit sign such as a restaurant drive-thru menu board.

Each lighting segment fixture 10 has a LED with an output of up typically three lumens, which results in an output on surfaces 12 of up to approximately 100 candelas per square meter.

Figure 3:
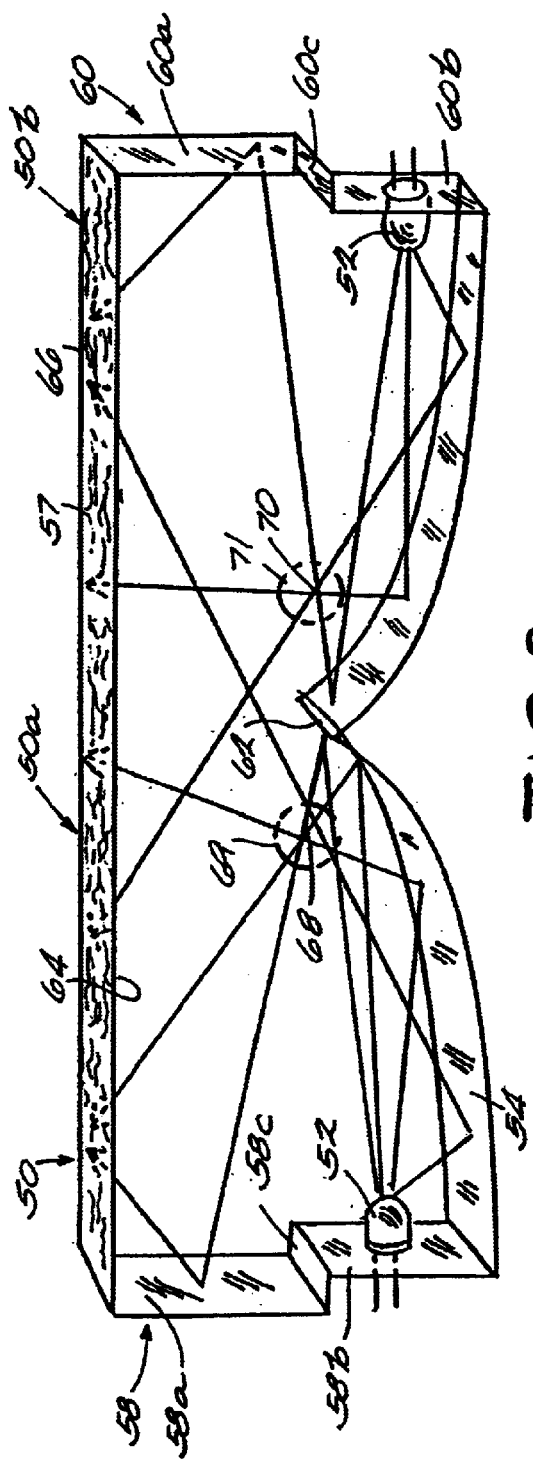
FIG. 3 is a second modular unit including two LEDs and two respective curved back surfaces.
Figure 4:
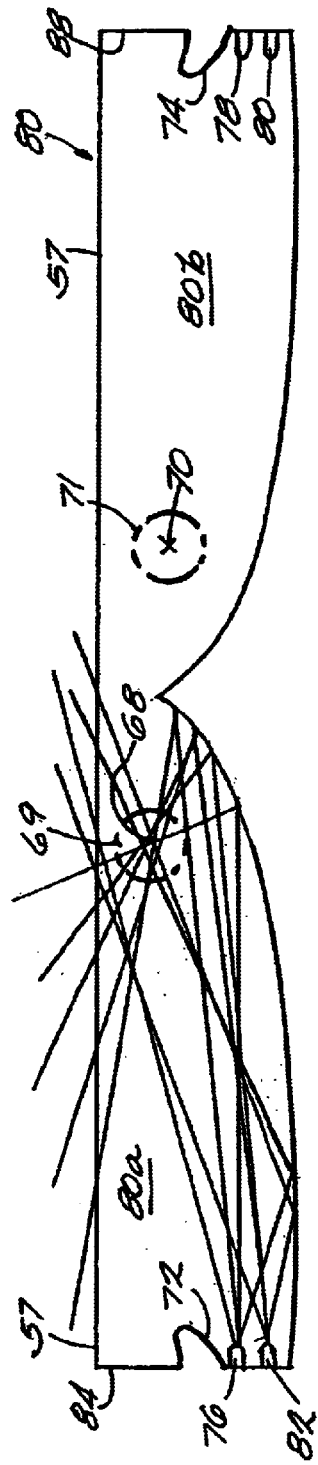
FIG. 4 is a lighting fixture similar to the lighting fixture FIG. 3 except that two adjacent LEDs are used in each section.

FIGS. 3 and 4 relate to another embodiment of the invention in which a lighting fixture 50 has two light emitting sections 50a and 50b, each section having at least one LED and a respective curved back surface 54, 56. However, lighting fixture 50 has a single output surface 57.

Lighting fixture 50 also has a first end surface 58 and an opposite corresponding end surface 60. First end surface 58 has a first section 58a, a recessed second section 58b to which is interconnected a LED 52, and an intermediate section 58c. Similarly, end surface 60 has a first section 60a whose shape and configuration corresponds to that of section 58a, a recessed section 60b to which is interconnected a LED 52, and an intermediate section 60c. The uses of surfaces 58a and 60a that have corresponding shapes and configurations enables a plurality of modules 50 to be placed end to end to achieve an elongated light bar having a substantially uniform output.

As shown in FIG. 3, curved surfaces 54 and 56 meet in a raised section 62, which may need to have a diffusive reflector to prevent a hot spot from forming at the raised section. Back surfaces 54 and 56 are preferably covered with respective specular reflectors, although diffusive reflectors could be used if side surfaces 64 and 66 are covered with respective reflectors.

Each of light emitting sections 50a and 50b has a respective focal point 68, 70. As with the embodiment depicted in FIG. 1, approximately 70 percent of the light emitted by LEDs 52 is directed toward the focal areas 69, 71 around respective focii 68 and 70, and the focii are positioned approximately one-half the distance between the output surface and the end surface.

The embodiment depicted in FIG. 4 is similar to the embodiment depicted in FIG. 3; respective components having similar configurations have been given the same part designations.

FIG. 4 differs from FIG. 3 in two primary respects: first, respective blocking surfaces 72 and 74 are positioned adjacent respective LEDs 76 and 78 to prevent light emitted from the upper sides of LEDs 76 and 78 from being directly incident upon output surface 57 without being first reflected. This arrangement avoids hot spots which could otherwise occur.

Second, the embodiment in FIG. 4 differs from the embodiment in FIG. 1 in that two LEDs are used in each light emitting section of the lighting fixture 80. That is, there are two LEDs 76 and 82 interconnected with end surface 84, and there are two LEDs 78 and 86 that are interconnected with end surface 88. The use of two LEDs in each light emitting section 80a, 80b enables certain effects to be achieved, such as fading from one color to another. Otherwise, the same considerations apply with respect to the embodiment in FIG. 4 as in the embodiment in FIGS. 1 and 3, namely that each light emitting section has a focal area 69, 71 around a respective focal point 68, 70, in which a significant part (about 70 percent) but not all of the light output passes.

FIG. 5 depicts an embodiment of the invention that is somewhat different from the other embodiments. In FIG. 5, lighting fixture 90 is comprised of light emitting sections 90a, 90b, 90c, 90d, and 90e. Each of sections 90a through 90e has a respective LED 92 and respective back curved surfaces 94a through 94e. LEDs 92 are interconnected with respective intermediate surfaces 93. Each of the curved back surfaces is coated with a reflector, which is preferably a specular reflector, but may also be a diffuse reflector. As clearly shown in FIG. 5, each of sections 90a through 90e also has a respective focal point 96a through 96e. Each of the focal points defines a respective focal area 97a through 97e through which a majority, preferably about 70 percent, of light emitted from the respective LEDs passes. The remaining light may proceed directly from the LED to the output surface 100.

Blocking surfaces 102 are also provided to prevent light emitted from the upper sides of LEDs 92 from directly being output through output surface 100, thereby avoiding visible bright or hot spots. Output surface 100 could be clear, but it preferably has a diffuser layer or diffuser formed integral therewith to achieve a more uniform output.

Lighting fixture 90 also includes a first end surface 104 and a second, opposite end surface 106 having a corresponding shape and configuration. As discussed above in connection with FIG. 1, the corresponding shape and configuration of the end surfaces enable the lighting fixture 90 to be used as a module, by placing it adjacent to other similar lighting fixtures.

FIG. 6 is a variation of the lighting fixture 90 of FIG. 5 wherein three LEDs 108, 110 and 112 are used in each section of the module. It is preferred that each of LEDs 108, 110 and 112 is of a different color, such as red, blue and yellow. The use of different colored LEDs, when properly controlled by a programmed control module 113, enables any color or combination of colors to be output through the output surface 114, including white. Of course, other lighting effects may be achieved, such as fading, sequencing and color changing. In other respects, the module 113 of FIG. 6 is similar to the module depicted in FIG. 5. Control module 113 is connected to LEDs 108, 110 and 112 by wires 115.

Figure 7:
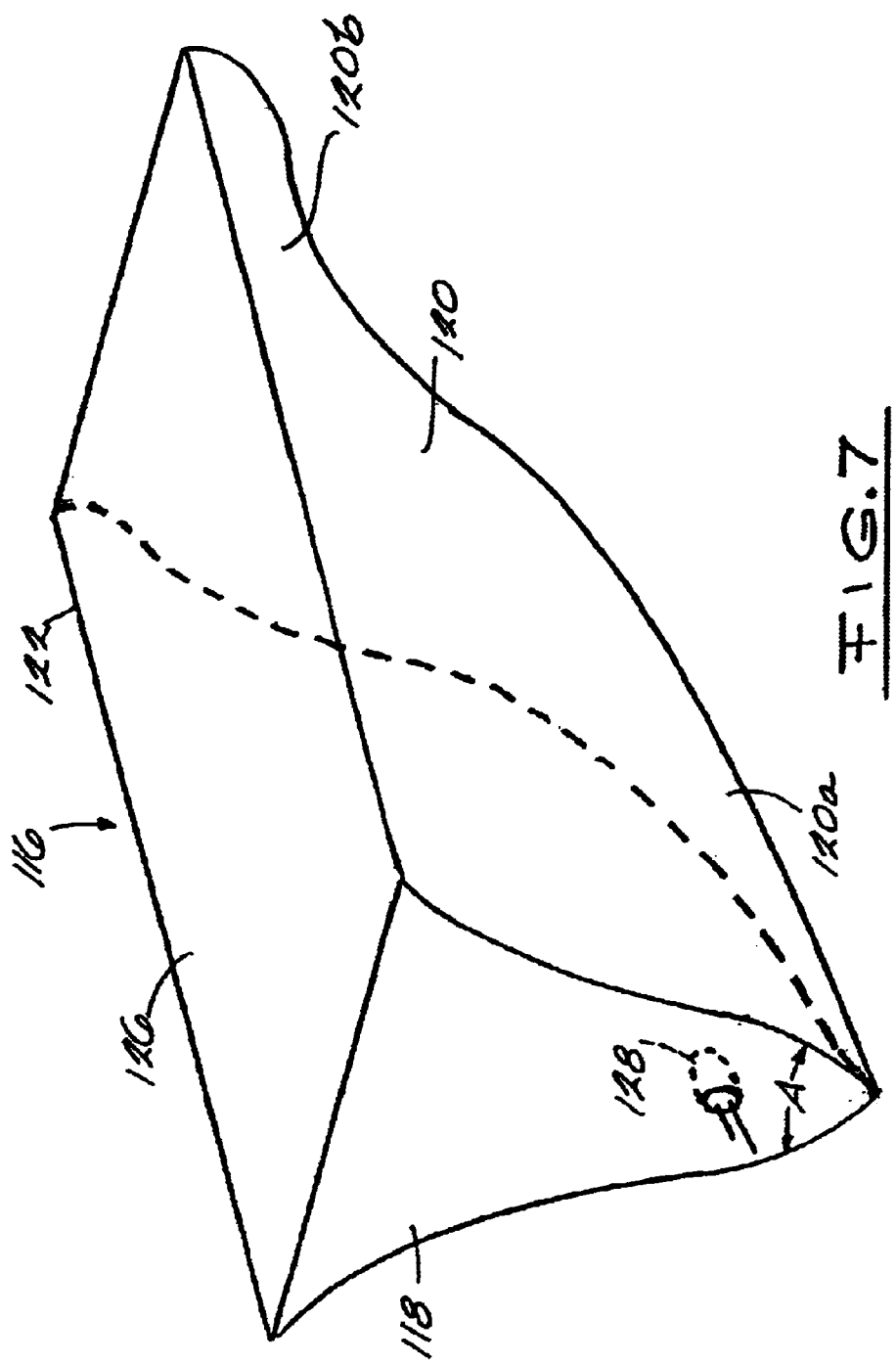
FIG. 7 depicts an alternate embodiment of a lighting fixture having a single light emitting diode.

FIG. 7 depicts another embodiment of the light fixture. In FIG. 7, light fixture 116 has a first end surface 118, and a second surface 120 that functions both as a curved back surface and as the second end surface. Surface 120 is curved in section 120a, but could be substantially flat in section 120b. If section 120b is substantially flat, section 120b may act as the second end surface of the other embodiments.

The lighting fixture depicted in FIG. 7 also has two side surfaces 122 and 124, and an output surface 126. Of course, the lighting module includes one or more LEDs 128.

A key feature of the lighting fixture 116 in FIG. 7 is that the output surface 126 is substantially wider than surface 120. That is, side surfaces 122 and 124 are not substantially parallel as in the other embodiments, but together form an acute angle A which is preferably between 1 to 60 degrees. This configuration of the lighting fixture 116 makes it particularly suitable for use as a segment in either a 7 or 14 segment display, such as those used to display alphanumerical characters in scoreboards and the like. The lighting fixture 116 is particularly suitable for these applications because the output surface is wider and thus easier to see. Also, the lighting fixture 116, due to its shape, is particularly suitable for injection molding or casting. Of course, each of the end, back and side surfaces may be covered with a reflector to further intensify the light output surface 126.

Figure 8:
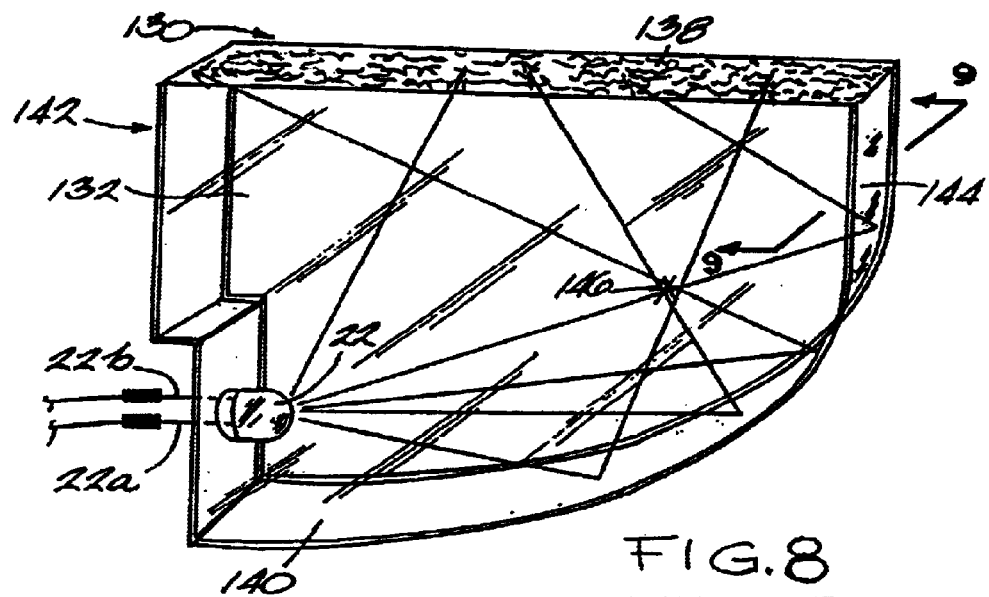
FIG. 8 is a perspective view of another embodiment having an air gap in the light guide.
Figure 9:
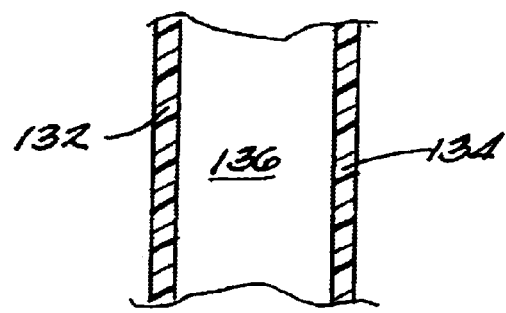
FIG. 9 is a cross section end view, taken along line 9—9 of FIG. 8.

FIGS. 8 and 9 relate to another embodiment of the present invention. In FIGS. 8 and 9, light guide 130 is comprised of two parallel side walls 132 and 134 with an air gap 136 therebetween. The light guide also includes an output surface 138 which is similar to the output surface 12 in FIG. 1. The light guide includes a curved back surface 140 which is similar to the back surface 16 discussed above. The light guide includes a first end surface 142 which is similar to the first end surface 14 in FIG. 1, and a second end surface 144 that is similar to the second end surface 18 of FIG. 1.

Unlike the embodiment depicted in FIG. 1, the embodiments of FIGS. 8 and 9 includes an air cavity 136 between side surface 132 and 134 that transmits light from LED 22. Focus point 146 is preferably disposed within the air cavity. The use of the air cavity reduces the overall weight of the light guide, and may also reduce its cost. Any of the embodiments shown in the figures or described herein could have an air gap in the light guide.

Figure 10:
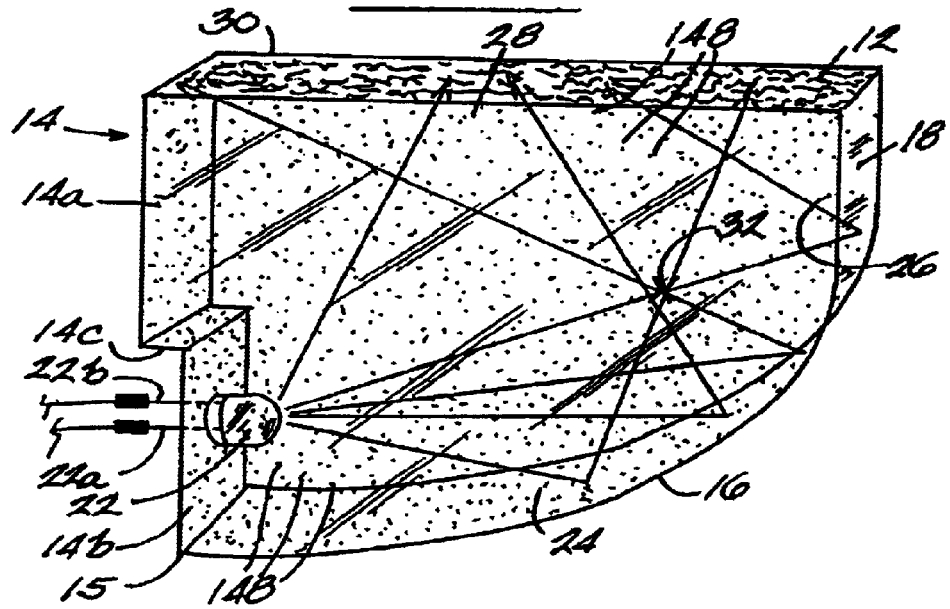
FIG. 10 is a perspective view of another embodiment having light diffusing particles.

FIG. 10 depicts yet another embodiment of the invention which is similar to the embodiment of FIG. 1 except that the light guide includes light reflective particles 148 dispersed therethrough. The remaining components in FIG. 10 generally correspond to the components in FIG. 1 having had been given the same part designations. Any of the embodiments depicted or described herein could alternatively use a light guide with light reflective particles.

The advantage of using an acrylic light guide material with light diffusive, or otherwise reflective particles is that superior light diffusion is achieved in a smaller light guide. As a result, the overall size of the light guide may be reduced, thereby reducing its cost.

One suitable material for the light guide of FIG. 9 is sold under the trademark ELIT, manufactured by Atoglas Division, ELF Altochem North America, Inc. Philadelphia, Pa.

While several embodiments of the present invention have been shown and described, other embodiments will be apparent to those skilled in the art and are within the intended scope of the claims.

What is claimed is:

1. A lighting fixture, comprising:
   a translucent member, including
      an output surface;
      a curved back surface having a first reflector thereon;
      first and second side surfaces;
      an end surface;
      a blocking surface;
      an intermediate surface adjacent said second curved back surface and said blocking surface; and
   at least one light emitting diode (LED) interconnected with said intermediate surface, wherein said blocking surface prevents light output from a side of said at least one diode from directly reaching said output surface, and wherein said curved back surface and said blocking surface are integrally formed as one piece with the translucent member.

2. The lighting fixture of claim 1, further comprising a diffuser formed integral with said output surface.

3. The lighting fixture of claim 1, wherein said first reflector is a specular reflector.

4. The lighting fixture of claim 1, wherein said first and second side surfaces are substantially parallel to each other.

5. The lighting fixture of claim 1, wherein said end surface is a first end surface, and wherein said lighting fixture further includes a second end surface opposite to said first end surface.

6. The lighting fixture of claim 1, further comprising a focal area through which at least fifty percent of light emitted from said at least one LED passes.

7. The lighting fixture of claim 1, wherein said at least one light emitting diode (LED) includes at least two LEDs of different colors, and wherein said lighting fixture further comprises:
a controller that controls the power to each of said LEDs to yield a desired light color output.

8. The lighting fixture of claim 1, wherein the shape of said curved back surface is such that light from said at least one light emitting diode is reflected off of said curved back surface toward a focal area.

9. The lighting fixture of claim 8, wherein said focal area is located approximately midway between said output surface and said curved back surface.

10. The lighting fixture of claim 1, wherein said first and second side surfaces are reflective.

11. The lighting fixture of claim 1, wherein said translucent member includes an air gap disposed between said first and second side surfaces.

12. The lighting fixture of claim 1, wherein said translucent member includes light reflective particles dispersed thereon.

13. A lighting fixture, comprising:
a translucent member, including:
an output surface;
a first curved back surface having a first reflector thereon;
first and second side surfaces;
an end surface;
a second curved back surface having a second reflector thereon;
an intermediate surface adjacent said second curved back surface;
a first light emitting diode (LED) interconnected with said end surface; and
a second light emitting diode interconnected with said intermediate surface, wherein said first and second curved back surfaces are integrally formed as one piece with the translucent member.

14. The lighting fixture of claim 13, further comprising a diffuser formed integral with said output surface.

15. The lighting fixture of claim 13, wherein said first reflector is a specular reflector.

16. The lighting fixture of claim 13, wherein said first and second side surfaces are substantially parallel to each other.

17. The lighting fixture of claim 13, wherein said end surface is a first end surface, and wherein said lighting fixture further includes a second end surface opposite to said first end surface.

18. The lighting fixture of claim 13, further comprising a focal area through which at least fifty percent of light emitted from said at least one LED passes.

19. The lighting fixture of claim 13, wherein said first and second light emitting diodes (LED) includes at least two LEDs of different colors, and wherein said lighting fixture further comprises:
a controller that controls the power to each of said LEDs to yield a desired light color output.

20. The lighting fixture of claim 13, wherein the shapes of said first and second curved back surfaces are such that light from said first and second light emitting diodes is reflected off of said first and second curved back surfaces toward a focal area.

21. The lighting fixture of claim 20, wherein said focal area is located approximately midway between said output surface and said first and second curved back surfaces.

22. The lighting fixture of claim 13, wherein said first and second side surfaces are reflective.

23. The lighting fixture of claim 13, wherein said translucent member includes an air gap disposed between said first and second side surfaces.

24. The lighting fixture of claim 13, wherein said translucent member includes light reflective particles dispersed thereon.

25. A lighting fixture, comprising:
a translucent member, including
an output surface;
a first curved back surface having a first reflector thereon;
first and second side surfaces;
an end surface;
at least one light emitting diode (LED) interconnected with said end surface;
wherein said translucent member includes
a first light emitting section including said first curved back surface; and
a second light emitting section including a second curved back surface having a second reflector thereon;
wherein said second light emitting section includes
an intermediate surface adjacent said second curved back surface;
a second light emitting diode interconnected with said intermediate surface; and
a blocking surface adjacent said intermediate surface, said blocking surface substantially preventing light output from a side of said second light emitting diode from directly reaching said output surface,
wherein said first and second light emitting sections are integrally formed as one piece with the translucent member.

26. The lighting fixture of claim 25, wherein said curved back surface of said first light emitting section is substantially parallel with said blocking surface of said second light emitting section.

27. The lighting fixture of claim 25, further comprising an adjoining surface between said curved back surface of said first light emitting section and said blocking surface of said second light emitting section.

* * * * *